United States Patent [19]
Hinderks

[11] 3,993,114
[45] Nov. 23, 1976

[54] PNEUMATIC TIRE

[76] Inventor: Mitja Victor Hinderks, 15a Adamson Road, Hampstead, London, N.W.3., England

[22] Filed: Mar. 13, 1974

[21] Appl. No.: 450,672

[52] U.S. Cl. .............................. 152/340; 152/310; 152/330 RF; 152/346
[51] Int. Cl.² ................................... B60C 5/06
[58] Field of Search .......... 152/195, 196, 203, 204, 152/205, 206, 207, 209, 334, 336, 340, 341, 342, 346, 347, 348, 415, 156, 155, 157, 159, 161, 162, 163, 164, 165, 166, 339, 330 A, 158

[56] References Cited
UNITED STATES PATENTS

| | | | |
|---|---|---|---|
| 616,516 | 12/1898 | Wilson | 152/339 |
| 640,851 | 1/1900 | Ancora | 152/339 |
| 642,838 | 2/1900 | Cochrane | 152/347 |
| 1,131,500 | 3/1915 | Ferry | 152/206 X |
| 1,279,694 | 9/1918 | Hofmeister | 152/204 |
| 1,440,553 | 1/1923 | Privett | 152/346 |
| 1,460,794 | 7/1923 | Grube | 152/204 |
| 1,589,470 | 6/1926 | Hood | 152/415 |
| 1,774,892 | 9/1930 | Kline | 152/339 |
| 1,875,102 | 8/1932 | Morse | 152/205 |
| 2,237,245 | 4/1941 | Wilson et al. | 152/347 |
| 2,740,448 | 4/1956 | Richardson | 152/207 |
| 3,025,902 | 3/1962 | Sanderson | 152/340 |

Primary Examiner—Drayton E. Hoffman
Attorney, Agent, or Firm—Wigman & Cohen

[57] ABSTRACT

This invention relates to pneumatic tires and more particularly to a so-called safety tire comprising a carcass having a tube accommodated therein and spaced from the carcass to form inner and outer air chambers. A loose, circumferentially extending, puncture-resistant band is positioned substantially in the mid-circumferential plane of the tire between the underside of the tire tread and the tube. A further feature of the invention is the provision of means which produces an audible signal should the outer chamber become deflated. Another feature of the invention is the provision of means which, in use, limit radial and-/or axial expansion of the tube should the outer chamber become deflated. A final feature is the provision of means which inhibit or prevent removal of the bead portions of the tire. from their respective seats upon deflation of the tire.

13 Claims, 18 Drawing Figures

U.S. Patent  Nov. 23, 1976  Sheet 1 of 2  3,993,114
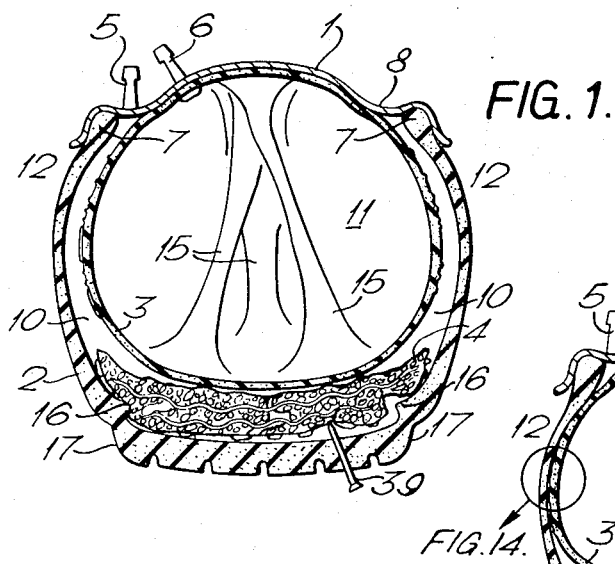
FIG. 1.
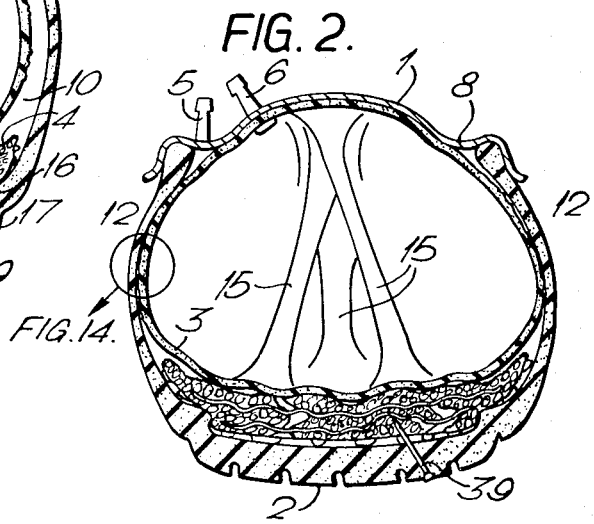
FIG. 2.
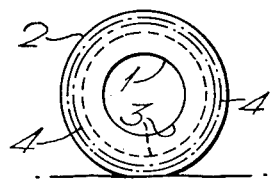
FIG. 3.
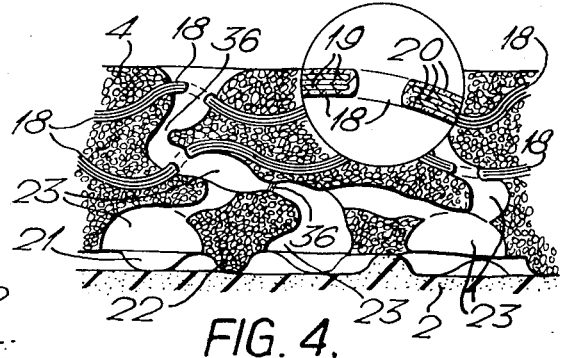
FIG. 5.
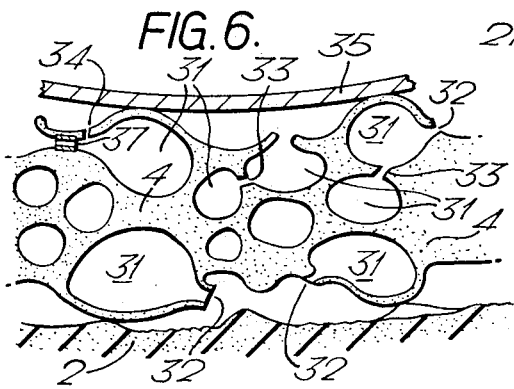
FIG. 6.
FIG. 4.
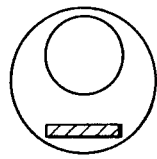
FIG. 7.
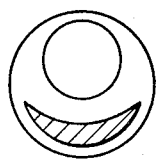
FIG. 8.
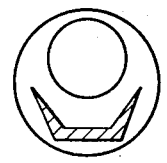
FIG. 9.

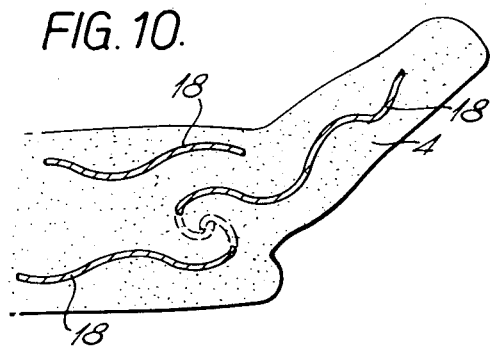
FIG. 10.
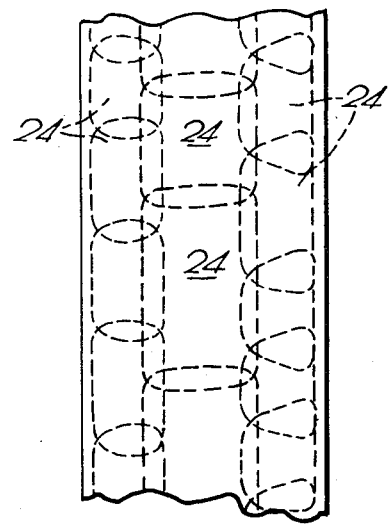
FIG. 11.
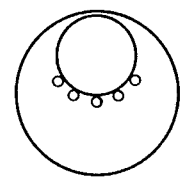 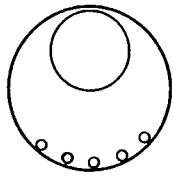
FIG. 12.  FIG. 13.
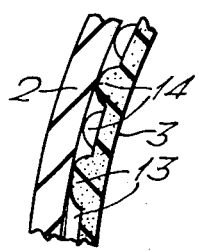 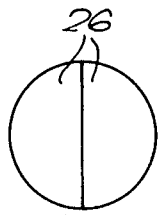 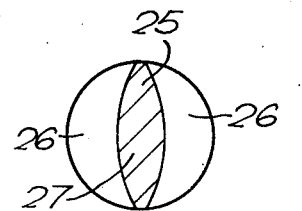
FIG. 14.  FIG. 15.  FIG. 16.
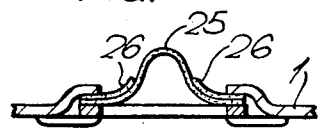 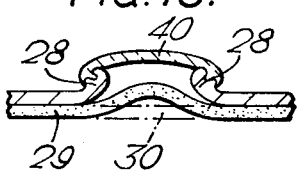
FIG. 17.  FIG. 18.

PNEUMATIC TIRE

The present invention relates to pneumatic tyres for motor vehicles and is directed more particularly to so-called "safety tyres". The objects of the invention are twofold. Firstly, to provide a simple and practical means to mitigate loss of control due to deflation of the tyre and to enable the tyre to be then driven a substantial distance in its deflated condition. Secondly, to provide a simple, inexpensive warning to the driver when deflation has occurred.

The provision of "safety tyres" is well known, and many ingenious proposals have been put forward during the last sixty years. Recently, with greatly increased passenger vehicle cruising speeds, several embodiments have been, or are planned to be, marketed by such tyre manufacturers as Goodyear, Firestone (LXX), Dunlop (Denovo), Avon, Bridgestone and Pirelli. Some of these are not true safety tyres, but are improvements to existing designs. One of the oldest approaches to the true safety tyre concept involves the rearrangement of the three components already used in current tyres, namely the tyre or carcass, the inner tube and the rim, whereby the tube is placed within the tyre but radially spaced therefrom to provide two definable and usually separate air volumes. This arrangement is basically ideal in all respects, but has one serious flaw in that a sharp foreign body piercing the tyre and thus causing the air chamber formed between the carcass and the tube to deflate, also causes the second chamber within the inner tube to deflate by puncturing the tube as it engages the inner surface of the carcass adjacent the underside of the tread and the protruding foreign object. Many solutions to overcome this basic flaw have been proposed including those disclosed in British patent specification No. 807,651, German patent specification No. 1,227,795, French patent specification No. 1,367,362 and U.S. Pat. Nos. 2,665,731, 2,802,504, 3,100,518, 3,225,811, 3,563,294 and 3,219,092.

Nearly all the above-mentioned prior specifications disclose the addition of extra reinforcing layers and/or spacer projections integral with or attached to the internal surface of the carcass or external surface of the tube to ensure that these two members remain spaced from one another when the air chamber between them deflates. With the exception of Goodyear, no one has marketed such a tyre due to two basic difficulties. Firstly, the provision, usually in rubber, of spacer projections or layers involves the addition of extra mass, with consequent high speed performance penalty. Secondly, the projections or layers involve considerable modification and complication of the carcass and tube construction with consequent price increases.

As will be appreciated from the following description, the object of the invention is to provide a solution to the above problem which does not necessitate any changes in the present construction of the three principle members forming a modern tyre i.e. carcass, tube and rim. all other safety tyre constructions known to the Inventor involve substantial changes in manufacturing techniques. The invention also affords the possibility of varying the safety factor of a given tyre according to the particular needs, pocket or location of the user.

Many safety tyre researches have centred on the problem of drawing the driver's attention to the fact that deflation of a tyre has occurred. This is very important as all such tyres are thereafter only safe for a limited distance and therefore the driver cannot proceed further without risk to the vehicle and himself. At high speed it is difficult to detect when a "slow" puncture has occurred in a normal tyre and with known partly deflating safety designs this is even more difficult. The solution partly adopted in the heavy truck industry is a complex and expensive measuring and sensing system, usually electrical, connected to gauges or indicators in the driver's cab, but such systems are not considered suitable for passenger vehicles. Some designs intended primarily for passenger vehicles include vibration inducing means which are activated when deflation occurs, but these are unsatisfactory in that the vibrations induced are moderate, in which case an ignorant or insensitive driver will not notice them or are so violent as to cause instability on certain road surfaces. The present invention, on the other hand provides an absolutely safe arrangement, of negligible cost which warns a driver when a puncture has occurred.

The present invention consists in a pneumatic tyre comprising a carcass, a tube accommodated in the carcass and spaced therefrom to form inner and outer air chambers, and a loose, circumferentially extending, puncture-resistant band positioned substantially in the mid-circumferential plane of the tyre between the underside of the tyre tread and the tube.

The invention also consists in a pneumatic tyre comprising a carcass, a tube accommodated in the carcass and spaced therefrom to form inner and outer air chambers, and a compressible material provide with a plurality of air pockets having discharge apertures positioned on the underside of the tyre tread or exteriorly of the tube, the arrangement being such that when the outer air chamber deflates the direct or indirect contact of the tube with the underside of the tyre tread adjacent the contact area with the road produces continuous ingress and egress of air from the pockets which produces an audible signal of the deflated condition of the outer air chamber. If desired, an optional visual indicator may be mounted in the rim to indicate the deflated condition of the outer air chamber.

The invention further consists in a pneumatic tyre comprising a carcass, a tube accommodated in the carcass and spaced therefrom to form inner and outer air chambers and means which, in use, limit radial expansion of the tube upon the outer air chamber being deflated.

The invention also consists in a pneumatic tyre comprising a carcass, a tube accommodated in the carcass and spaced therefrom to form inner and outer air chambers and means which, in use, limit axial expansion of the tube upon the outer air chamber being deflated.

The invention still further consists in a wheel for a pneumatic tyre, said wheel having a rim comprising spaced flanges which, at their smallest diameter join with the rim proper to provide a seat for the respective bead portions of a tyre, said seating portion of the rim proper increasing in diameter towards the mid-circumferential plane of the rim to inhibit or prevent removal of the bead portions of the tyre from their respective seats upon deflation of the tyre.

In the accompanying drawings:

FIG. 1 is a cross section through a safety tyre according to the present invention and showing the tyre in normal running order, with a foreign body just entering the carcass with no deflation having yet occurred.

FIG. 2 is a view similar to FIG. 1, but showing the tyre after deflation of the outer air chamber.

FIG. 3 is a side elevation of the safety tyre shown in FIG. 1, showing the position of its main elements.

FIG. 4 shows by way of example part of the loose interlayer 4 of FIG. 1, showing in greater detail its construction.

FIG. 5 is to a larger scale showing membrane construction.

FIG. 6 similarly shows part of a loose interlayer, showing an alternative construction having special acoustical air volumes.

FIGS. 7 to 9 show diagrammatically alternative basic cross-sectional forms of belt construction.

FIG. 10 shows diagrammatically part of the interlayer of FIG. 9.

FIG. 11 show diagrammatically a part plan portion of an interlayer showing non-continuous overlapping or intermeshing reinforcing members.

FIGS. 12 and 13 show diagrammatically alternative positions for the acoustical air volumes.

FIG. 14 shows a cross-sectional detail near the clinch area, with spacer members between tube and tyre.

FIGS. 15 to 17 show details of a rim visual air pressure indicator suitable for the outer chamber.

FIG. 18 is a view of an indicator suitable for the inner chamber.

In carrying the invention into effect, according to one convenient mode, by way of example, a tyre assembly comprises a rim 1 on which is mounted a tyre carcass 2 which accommodates an inner tube 3 spaced from the carcass 2 to form an outer air chamber 10 and an inner air chamber 11. A circumferential band or interlayer 4 extends around the underside of the tread portion of the tyre on approximately the mid-circumferential plane thereof. The rim 1 is of inverted saucer-shaped cross-section with each lip of the saucer extending in an s form. In place of the conventional flat section rim adjacent the bead seating area 7 there is a gradual increase in the diameter of the rim towards the midcircumferential plane thereof to form a shallow retaining ridge 8 which produces the required spacing between the tube 3 and carcass 2 and to retain the latter positioned in the bead area 7 upon deflation of the outer air chamber 10.

Each air chamber has a separate inflation valve 5 and 6 and to ensure that the outer chamber is always inflated correctly, spacers 13 and 14 (FIG. 14) are positioned between the tube 3 and carcass 2 at appropriate points, but in particular, adjacent the clinch area 12. Examples are shown in FIG. 14 in which the tube 3 is shown having both ridged projections 13 or nodules 14. The tube 3 has optional internal restraining or tension members 15. The interlayer 4 is loosely positioned in the air chamber 10, but may be restrained laterally by projections or ridges 16 on the inner surface of the carcass 2 adjacent the shoulders 17.

The interlayer may be constructed of any suitable material which for practical reasons should be light, puncture-resistant and flexible, and could therefore basically consist of aerated or cellular tensile and puncture-resistant rubber, polymer or plastics (hydrocarbon based) material. The interlayer could be strengthened by the provision of reinforcing layers of stronger denser material, either similar to that used as base or of metal, say of very thin high-tensile spring steel, similar to that used in razor blades. This may be so thin as to best be described as a foil and to be of three dimensional wavy or dimpled configuration to permit the whole interlayer more easily to stretch. FIG. 4 shows such an interlayer 4 having multiple separate three-dimensional reinforcing layers 18.

In the embodiment shown in detail in FIG. 5 each layer comprises a laminated construction consisting of separate layers of foil 19, which may optionally be interleaved, encased and/or keyed into a surrounding tough buffer material 20 of plastics polymer rubber or wax, so as to better prevent any sharp edges of the foil chafing through the interlayer and/or coming into contact with the carcass 2 or tube 3. The interlayer 4 may have keys, ridges 21 or nodules 22 on its lower surface area for better traction with the carcass 2 under run-flat conditions, or the internal surface of the carcass 2 may have similar internal projections (not shown) to achieve a similar function. This partial separation of the carcass and interlayer also allows air movement between then and therefore reduces heat build-up in the tread. This air space may be connected to that above the interlayer by passages 23 extending through the interlayer 4 to assist further in the ventilation of the internal tread area, these passages 23 preferably being irregularly inclined or twisted to inhibit or prevent easy penetration of foreign objects such as nails, 39.

The interlayer may be of one of the basic forms shown in FIGS. 7 to 9, where in FIG. 7 it is substantially flat, covering the tread area generally, in FIG. 8 it is substantially crescent-shaped in cross-section, giving protection also to the carcass sidewalls, and in FIG. 9 also covering partly the sidewalls, it is in three distinct sections. In case of the latter, a slight hinging effect may be incorporated between the sections, amongst other means by making discontinuous any reinforcing membranes, as illustrated in part section in FIG. 10. Such discontinuity may be embodied by having, as shown in FIG. 11, the reinforcing membranes comprising a series of interlocking, intermeshing, or adjacent shapes 24 formed within the interlayer 4. The embodiment shown discloses an asymmetrical design to allow for the disproportionate cornering loads imposed on each shoulder of a tyre in a given fitted position.

Simple indicators can be mounted in the wheel rim to indicate the air pressure in one or both chambers especially desirable since in the event of a puncture it is convenient to know which volume has deflated. In the rim a simple rubber diaphragm 25 is mounted communicating with the outer air chamber, which may optionally have another split diaphragm 26 of contrasting colour mounted over it.

When the outer volume is deflated, only the upper diaphragm is visible (FIG. 15), but when inflated the lower integral structural diaphragm bulges out, thereby parting the upper diaphragm and exposing a section of contrasting colour 27, as shown in plan FIG. 16 and section FIG. 17. Using similar principles as shown in section FIG. 18, a rounded edged aperture 28 may be provided proximate to the centre of the rim which exposes a bulge of the tube casing 29 when it is properly inflated but which presents at most a relatively flat plane 30 when under or uninflated. The spring may be protected by a transparent cap 40. Attached to the interlayer, carcass or tube are acoustical air volumes, preferably formed of the same material as that of the element to which they are attached. They consist of any air volume defined within a flexible housing of some such material as rubber polymer, hydrocarbon (plastics) etc., such volume having an opening discharging into the outer (air) chamber 10 between the tube and the carcass. This opening may be directed, by means of passage, for example, which may have a trumpet configuration, and having optional additional discharge means (apertures) to the outer air chamber. The relationship of size of the discharge means in relation to the size of acoustical volume is that when this volume is compressed suddenly a sound is produced.

FIG. 6 shows a part section of an interlayer, parts made of compressible material having acoustical volumes 31, which in turn have apertures 32, passages 33, and further apertures 34 connecting the air within these volumes 31 directly or indirectly to the outer air chamber 10 of the safety tyre assembly.

In operation, the acoustical volumes act as a crude (musical) instrument, as a bellows producing sound when rapidly compressed and allowed to return to the original form. Such compression is likely to occur when deflection of the outer chamber takes place and the relatively hard inflated tube 35 settles on the (projecting) housings at the acoustical volumes. This acoustical effect can also be achieved within an interlayer by making it of overall compressible configuration and providing within it air volumes interconnected and/or directly or indirectly communicating with the outer air chamber 10. Alternatively, the twisting passages 23 of FIG. 4 may have disposed within them members or restricting means 36 designed to produce a noise when air is rapidly forced past these members or means. Any throats, passages, openings, etc. may be provided with metal inserts 37 of nozzle or tubular or stringed configuration if compressible materials used otherwise are not readily conducive to sound production. In a preferred embodiment, the interlayer, having a bellows upper surface at least partly defining acoustical volumes nearly fills the space between the tube and the carcass tread. When deflation drops below a desired level, the tube will touch the acoustical volumes producing some noise, the noise becoming more intense with increased deflation of the tyre as more pumping of air into and out of the acoustical volumes occurs. Of course, the bellows, pumping action is due to the fact that contact between surfaces will only take place about the contact area, i.e. the area immediately above the road. Since the whole assembly rotates, each acoustical volume is compressed and "deflated" only and each time it passes through the contact area, returning to its normal "inflated" configuration immediately afterwards and remaining so for a complete revolution until it again passes through the contact area.

The essence of the inventiveness of the interlayer is that it is of light, aerated construction and is loose, i.e. free to float in an air chamber and not attached to any other member nor, in normal use, forcibly wedged or clamped between the carcass and the tube. This means that the penetrative force of a foreign object, such as a nail, which has pierced the carcass is not transferred to the interlayer, because it is not restrained but is free to move radially inwards with the entering foreign object. Any protective layer which is fixed is infinitely more likely to be pierced by the momentum and force of the foreign object. The interlayer being of puncture-resistant material, it will tend to ride with the entering object rather than impale itself on it. If the outer volume deflates, only then is there any risk of the interlayer being penetrated, since the tube will cause a pressure to be exerted between penetrating object and interlayer.

However, this pressure or point loading about the tip of the object will be relatively gradual and without momentum, and in any case very small since the tube being a flexible inflated member will deform itself around the penetrating object, heavily cushioned from it by the relatively thick (aerated) interlayer, and transmit loads about the adjoining areas. It can be seen that the point loadings, especially with momentum or kinetic loadings eliminated, will be relatively small at the contact between object and interlayer. However these loadings are not in themselves relevant, in contrast to those on the tube. It will be clear from the description of the interlayer that virtually none of these loadings will be transferred through it to the contact area between tube and interlayer, thereby preserving the integrity and safety of the tube. The fact that the interlayer is free to move means that once it has to a degree been impaled by a protruding object, the subsequent pressure of the tube, movement of tyre, etc. will tend to bend or deflect the object from the non-perpendicular and that the interlayer can accommodate such movement.

When the outer air chamber deflates, the interlayer thereupon to a degree transfers traction from the tube, still firm on the rim, to the now less secure tread. Therefore, the provision of suitable projections may assist traction, as well as allowing air movement, between the underside of interlayer and tread, especially where such projections are arranged, say in form of pads, lugs, or ridges, to form a tread pattern as shown in the art. Similarly, as shown in the embodiments illustrated, the provision of a dimpled, part bulbous, or otherwise worn flat upper surfaces to the interlayer will assist traction being transmitted between it and the tube, especially where such projections are gently rounded.

In operation, it is intended that the pressures in the tyre and tube be roughly equal, or that that the tube has greater pressure, (under special circumstances it may have less). When the tyre is punctured its pressure is reduced to atmospheric, causing the tube - supporting the weight of the vehicle — to come into contact with at least the internal surface of the tread area of the tyre. However, the tube, which has some degree of elasticity, will expand when the tyre pressure drops (roughly equal pressure both sides of the tube wall has limited its expansion under normal running conditions), and will therefore take up a greater proportion of the cross-sectional area of the normal overall tyre profile. The tube may be so designed, and the relationship of its pressure to that of tyre and atmosphere so adjusted, that on the tyre puncturing it expands to such a degree that it almost entirely fills the normal (unpunctured) volume of the tyre, which in effect converts from a "tubeless" to a "tubed" type. If the tyre did not automatically expand to this extent on puncture, it could be so designed that the addition of air would enable it to fill the interior of and support the damaged tyre. The assembly could be further designed so that in its normal state the walls of the tube are relatively close to the sides of the tyre but further away from the tread area, where there is the greatest danger of puncture by foreign objects such as nails. Such an arrangement, especially if the tube had greater pressure than the tyre, would provide additional cornering stability. The degree of this stability could be adjusted (say for competition or rally driving) by increasing or decreasing the tube pressure. The tube might be so inflated as to continuously touch the sides but not the underside of the tread portion of the tyre under normal use.

To insure an intended relationship and spacing between the tube, interlayer and carcass in a particular area or direction, even when accidental over — or under — inflation has taken place, or to enable a tube on inflation to expand disproportionately in one direction as opposed to another despite a more uniform wall construction, there may be provided within the tube internal restraining means 15 as shown in FIG. 1. These may be of integral construction with the tube, be of stretchable and/or elastic material such as rubber and be of web like configuration, the web, like tyre plies, lying at any suitable angle in relation to the rolling direction and/or camber angle as has been mentioned.

It is intended that the invention provides a means of providing a tyre assembly which can be adapted to the varying needs of the user, in fact, part of the invention, the rim plus carcass, can be adapted to be used as an ordinary tubeless-type tyre, if necessary blanking off a hole-type tube pressure indicator. If the user desires a degree of what can be described as puncture-mitigation safety, (they cannot be prevented) then the inner tube can be fitted, and two compressed air chambers formed. This will provide protection against those punctures not involving penetration of the carcass by a foreign object. Protection can be obtained against the latter by the provision of the circumferential band, perhaps of a type providing audible warning. The toughness and size of the band could be varied according to the protection necessary; a European city dweller would need a relatively light band whilst a construction worker or a country dweller could choose a tougher interlayer. Especially tough bands could be available for explorers, polar and ice travel, sahara dwellers etc. In all cases a standard type carcass may be used, without any variation in production means to cater for differing requirements, which could be met by varying the less complex and expensive internal arrangements of the tyre assembly. Furthermore, a user having a given vehicle with given tyres could alter his safety protection by simply varying the internal arrangements of the assembly either himself or at a local repairshop.

In conclusion, it can be seen that the invention comprises a simple concept which is infinitely adaptable, and can readily be adapted to existing type carcass and tube and pin manufacturing techniques. No element is disposable in the event of internal rearrangement taking place. The means of warning of deflation, as well as the visual pressure indicators can be made available in the invention at neglible cost and to great safety benefit. It is felt that the invention constitutes one of the few safety type concepts which is really practical for general use by private and commercial vehicles.

Although the term "air" has been used, for convenience, throughout the foregoing description and following claims, it will be realised that this term is intended to cover any other suitable gas.

I claim:
1. A pneumatic tyre comprising a carcass, a tube accommodated in the carcass and spaced therefrom to form inner and outer air chambers, a loose, circumferentially extending, puncture-resistant band positioned substantially in the mid-circumferential plane of the tyre between the underside of the tyre tread and the tube, said band including irregular passages extending therethrough, and wherein said passages are provided with means which are operative for producing an audible signal when air passes therethrough.

2. A pneumatic tyre as claimed in claim 1, wherein there is provided projections on the inner surface of the carcass for restricting lateral movement of the band.

3. A pneumatic tyre as claimed in claim 1, wherein the band is constructed of a material having multiple air pockets therein.

4. A pneumatic tyre as claimed in claim 1, including spacer means provided on the inside of the carcass at the underside of the tyre tread.

5. A pneumatic tyre as claimed in claim 1, including spacer means provided on at least one circumferential surface of the band.

6. A pneumatic tyre as claimed in claim 1, including spacer means provided on the surface of the tube confronting the outer air chamber.

7. A pneumatic tyre as claimed in claim 5, wherein said spacer means comprise acoustical air chambers.

8. A pneumatic tyre as claimed in claim 1, wherein the band comprises at least one reinforcing layer.

9. A pneumatic tyre as claimed in claim 8, wherein each reinforcing layerconsists of separate layers of material.

10. A pneumatic tyre as claimed in claim 1, wherein the band is provided with a series of intermeshing reinforcing layers.

11. A pneumatic tyre comprising a carcass, a tube accommodated in the carcass and spaced therefrom to form inner and outer air chambers, and a compressible material provided with a plurality of air pockets having discharge apertures, said material being positioned on the underside of the tyre tread and exteriorly of the tube, the arrangement being such that when the outer air chamber deflates the compression of the material between the tube and the underside of the tyre tread adjacent the area of contact of the tyre with the road produces continuous ingress and egress of air from the pockets to thus produce an audible signal indicative of the deflated condition of the outer air chamber, and wherein said air pockets are provided with insert means for assisting in the production of said audible signal.

12. A pneumatic tyre as claimed in claim 11, including means in said tube for restraining outward circumferential movement of the tube.

13. A pneumatic tyre as claimed in claim 12 wherein said restraining means comprise elastic web members integrally formed within said tube and extending across a diameter of the tube cross-section.

* * * * *